United States Patent Office 3,835,027
Patented Sept. 10, 1974

3,835,027
HYDROGENATIVE CONVERSION PROCESSES AND CATALYST FOR USE THEREIN
John W. Ward, Yorba Linda, Calif., assignor to Union Oil Company of California, Los Angeles, Calif.
No Drawing. Filed Apr. 17, 1972, Ser. No. 244,947
Int. Cl. C10g 13/02, 31/14
U.S. Cl. 208—111                    10 Claims

ABSTRACT OF THE DISCLOSURE

Hydrocarbon conversion methods employing unique catalyst compositions exhibiting improved conversion characteristics particularly as regards denitrogenation and/or cracking selectivity to predetermined boiling range products involve the use of a catalytic combination of zeolitic aluminosilicates, alumina, and at least one of the metals, oxides and sulfides of Periodic Groups VI and VIII, prepared by the method including the steps of thermally activating at least a major portion of the alumina at a temperature of at least about 600° F. prior to combination with both the aluminosilicate and the hydrogenation component, forming an aggregate from an intimate admixture of the alumina, aluminosilicate and hydrogenation component and thermally activating the resultant aggregate. Midbarrel hydrocracking processes of higher selectivity and superior denitrogenation methods are described.

BACKGROUND

The utility of numerous refractoring oxides, such as silica, alumina, zironia, magnesia, beryllia, amorphous and crystalline aluminosilicates and the like for hydrocarbon conversion is well known. However, as is the case in every process involving expensive raw materials, catalysts and operating equipment, there remains considerable room for improvement in every aspect of these procedures. For an example, many hydrocarbon feeds contain organonitrogen compounds—known catalyst inhibitors—in such quantities that it is generally preferable, and often essential, to reduce the organonitrogen content before attempting to effect other conversions such as cracking, hydrocracking, isomerization, or related processes.

Every catalyst presently employed for this purpose requires the use of relatively expensive materials in its composition, such as refractory exide supports and hydrogenation components. They further require that the feed be contacted in costly pressurized equipment at elevated temperatures for periods sufficient to effect the desired reduction in organonitrogen content. The development of systems which can do this with less expensive compositions or lesser amounts thereof, less severe reaction conditions and shorter contact times is obviously a worthy objective.

Another area of hydrocarbon conversion in which there also remains room for improvement is that of hydrocracking, particularly midbarrel hydrocracking. In the hydrogenative conversion of hydrocarbons to midbarrel range products boiling between about 300 and 700° F. there is always some conversion of feed constituents to products boiling below the desired minimum product boiling point. In fact a substantial proportion of the feed is always converted to very low molecular weight products referred to as "dry gas." Production of these and other low molecular weight materials reduces midbarrel yield and is thus undesirable. Even a minor improvement in selectivity can result in substantial savings by minimizing by-products formation and the expense of separating and handling those by-products.

For example, if a hydrocracking process intended for the production of midbarrel fuels is operated at 50% conversion per pass and 50% selectivity to the desired boiling range product, an increase in selectivity of only 5% can increase yields of the desired product by 10% on a relative basis. On a commercial scale wherein the average unit usually consumes approximately 20,000 barrels a day of feedstock, this difference in selectivity can result in a savings of roughly 2,000 barrels of feed a day.

I have now discovered a procedure involving a particular catalyst composition whereby hydrocarbons can be converted more efficiently to products boiling within a predetermined boiling range. I have also discovered a procedure whereby the denitrogenation activity of certain catalyst compositions can be markedly improved.

It is therefore one object of this invention to provide an improved hydrocarbon conversion catalyst. It is another object to provide a catalyst exhibiting higher selectivity to products boiling within a predetermined boiling range. Another object is the provision of a method for producing such catalyst. Yet another object involves the provision of a midbarrel hydrocracking process having higher selectivity to midbarrel fuels. Another object is the provision of an improved hydrocarbon denitrogenation catalyst. Another objective involves the provision of a more efficient hydrocarbon denitrogenation process.

In accordance with one embodiment of this invention an improved hydrocarbon conversion catalyst containing at least one amorphous refractory oxide, a catalytically active amount of one or more crystalline zeolitic aluminosilicates and a hydrogenation component selected from the Group VI and VIII metals, oxides and sulfides is prepared by thermally activating the amorphous oxide at a temperature of at least about 600° F., preferably about 600° to about 1400° F., intimately admixing it with the aluminosilicate in finely divided form, forming a particle aggregate of the oxide, zeolite and hydrogenation component or hydrogenation component precursor, and thermally activating the resultant aggregate. Such activation is preferably effected at a temperature of at least about 600° F.

The combination of the oxide and crystalline aluminosilicate can be dried if desired, e.g., at a temperature below 600° F., prior to combination with the hydrogenation component. However, such treatment is not essential. In fact, it is more economical to defer any thermal treatment whatever until addition of the hydrogenation components. Accordingly, the preactivated oxide, zeolite and hydrogenation components are preferably formed into an aggregate mass, such as a pellet, tablet, extrudate, coating or the like without intermediate thermal treatment.

This procedure leads to the formation of a catalyst having several improved characteristics, notably improved denitrogenation activity and hydrocracking selectivity to a predetermined boiling range product, particularly midbarrel range products. As a result of this observation, I have found that more desirable catalysts and methods employing the same can be obtained without the expense or complexity of more involved alternative procedures. For example, the final catalyst could be produced by first forming an aggregate of the aluminosilicate and alumina, thermally activating that aggregate and then adding the hydrogenation component. The procedures and compositions herein disclosed eliminate the need for this multi-step process and enable the production of highly active and selective compositions by much simpler means.

The presently preferred method involves intimately admixing the oxide, zeolite and hydrogenation component with sufficient water to form a paste suitable for extrusion, pelleting or the like. The amount of aqueous medium added during the admixture of these materials is preferably sufficient only to produce a formable paste. This procedure eliminates the need for cumbersome separation, drying or other steps necessary to remove relatively large quantities of excess water.

In accordance with another embodiment of this invention, I have discovered that organonitrogen containing feedstocks can be more efficiently denitrogenated by contacting with hydrogen with the above-described catalyst under denitrogenation conditions of temperature, pressure and contact time as hereinafter detailed. As a result of this method the rate of organonitrogen conversion can be increased several fold so that the same degree of denitrogenation can be obtained under much less severe conditions or with shorter contact times. Conversely higher denitrogenation rates are realized at otherwise identical conditions.

Another embodiment involves an improved hydrocracking method whereby markedly higher relative conversions to products boiling with a predetermined boiling range are obtained. In particular I have discovered that the specific combination of reaction conditions, catalysts and feed compositions hereinafter detailed affords higher hydrocracking selectivity to lower molecular weight products boiling within a prescribed range. For instance under otherwise identical conditions these systems are capable of producing 10 relative percent more midbarrel range products, boiling between 300° and 700° F. than are alternative methods.

Essentially any crystalline zeolitic aluminosilicate can be employed in these compositions. A preferred class of aluminosilicates includes the crystalline species having $SiO_2/Al_2O_3$ ratios of at least about 2. This class includes both synthetic and naturally occurring zeolites. Illustrative of the synthetic zeolites are Zeolite X, U.S. 2,882,244; Zeolite Y, U.S. 3,130,007; Zeolite A, U.S. 2,882,243; Zeolite L, Bel. 575,117; Zeolite D, Can. 611,981; Zeolite R, U.S. 3,030,181; Zeolite S, U.S. 3,054,657; Zeolite T, U.S. 2,950,952; Zeolite Z, Can. 614,995; Zeolite E, Can. 636,931; Zeolite, F. U.S. 2,995,358; Zeolite O, U.S. 3,140,252; Zeolite B, U.S. 3,008,803; Zeolite Q, U.S. 2,991,151; Zeolite M, U.S. 2,995,423; Zeolite H, U.S. 3,010,789; Zeolite J, U.S. 3,001,869; Zeolite W, U.S. 3,012,853; Zeolite KG, U.S. 3,056,654; Zeolite SL, Dtuch 6,710,729; Zeolite Omega, Can. 817,915; synthetic mordenite; the so-called ultrastable zeolites of U.S. 3,293,192 and U.S. 3,449,070; the so-called layered aluminosilicates such as those described in U.S. 3,252,757 and 3,252,889, and the like. Illustrative of the naturally occurring crystalline zeolites are levynite, dachiardite, erionite, faujasite, analcite, paulingite, noselite, ferrierite, haulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite. Zeolites which are presently most preferred include the synthetic faujasites X and Y, zeolite T, L omega, mordenite and pretreated and post treated forms thereof such as the acid extracted and so-called ultrastable zeolites. This preference is due primarily to chemical and physical properties such as pore size, pore volume, surface area, ion exchange capacity, physical and chemical stability and catalytic activity.

Although the advantages of this invention can be realized with the foregoing aluminosilicates, I presently prefer the use of pretreated zeolites having exceptionally high thermal, hydrothermal and reammoniation stability, activity and selectivity as hereinafter described. In accordance with this preferred embodiment the starting material is first exchanged with hydrogen ions or hydrogen ion precursors in amounts sufficient to occupy at least 20 percent of the ion exchange capacity of the zeolite. A corresponding amount of the alkali metal originally present in the zeolite is replaced by the hydrogen ion precursors or hydrogen ions introduced by direct exchange. This first exchange step is preferably sufficient to reduce the alkali metal content to less than 3 percent, preferably less than 2 percent. This procedure is usually sufficient to introduce at least about 0.5 milliequivalents of hydrogen ions or hydrogen ion precursors per gram of zeolite. Of course, each of these exchanges can be carried out in a single step or a plurality of steps, the latter approach often bing preferred or even necessary to obtain the desired degree of exchange.

Hydrogen ion precursors are generally well known and include ions which are exchangeable into aluminosilicates and decompose upon exposure to elevated temperatures to form the hydrogen or decationized zeolite. Illustrative of thesse materials are the organic and inorganic ammonium salts such as ammonium halides, e.g., chlorides, bromides, ammonium carbonates, ammonium thicynate, ammonium hydroxide, ammonium molybate, ammonium dithionate, ammonium nitrate, ammonium sulfate, ammonium formate, ammonium lactate, ammonium tartrate and the like. Other suitable exchange compounds include the class of organic nitrogen bases such as pyridine, guanidine, and quinoline salts. Another class of organic compounds includes the complex polyhydrocarbyl ammonium salts, e.g., the tri- and tetraalkyl and aryl salts such as trimethylammonium hydroxide and tetraethylammonium hydroxide.

In the alternative the hydrogen ion can be introduced directly in the first exchange step by contacting the aluminosilicate with a hydrogen ion donor such as an organic or inorganic acid. Hydrogen ions introduced in this manner are herein referred to as unstabilized hydrogen ions since they have not yet been subjected to stabilizing thermal treatment. Illustrative inorganic acids include hydrochloric, phosphoric, sulfuric, nitric, sulfurous, chloroplatinic, dithionic, thiocyanic, carbonic, nitrous and the like. The organic acids include the mono-, di- and poly-carboxylic acids having either aliphatic, cycloliphatic or aromatic hydrocarbyl radicals. Illustrative of these compounds are formic acid, propionic acid, melanic acid, alkenylsuccinic acid, itaconic acid, malonic acid, acetic acid, chloroacetic acid, 1,4-cyclohexadicarboxylic acid, terephthalic acid, 1,8-naphthalenedicarboxylic acid, 3-carboxycinnamic acid, phenylacetic acid, benzoic acid, substituted aromatic acids such as the chlorohydroxy-, or nitro- substituted benzoic acid and the like. However, it is presently preferred that the hydrogen ion be introduced by exchange with an inorganic ammonium salt such as ammonium nitrate or ammonium sulfate and thermal conversion to hydrogen ion.

I have found that in order to produce a composition having the desired ultimate properties it is essential that the zeolite be steamed following the first exchange, as opposed to calcination under anhydrous conditions. It is believed that maintaining at least a measurable amount of water vapor in the vicinity of the zeolite during this first thermal treatment is necessary to preserve a higher degree of the structural integrity while maintaining ion exchange capacity, catalytic activity, increasing pore size distribution and improving selectivity to midbarrel fuels under hydrocracking conditions. Accordingly, this thermal treatment is usually conducted in the presence of at least about 0.2, usually at least 2 and preferably about 5 to about 15 p.s.i. water vapor partial pressure.

The zeolite can be steamed by any procedure capable of maintaining a substantial amount of water vapor in the presence of the zeolite during at least the initial stages of the thermal treatment. For example, the exchanged zeolite can be introduced into a batch or continuous rotary furnace, a moving bed furnace or static bed calcination zone into which humidified air, or more preferably pure steam, is introduced either concurrently or countercurrently. In the alternative, water vapor released by the zeolite during the initial stages of calcination can be trapped and retained in the presence of the zeolite.

Steaming should be effected at a temperature sufficient to thermally stabilize and/or convert the zeolite to the corresponding hydrogen or decationized form yet insufficient to thermally degrade a substantial portion of the aluminosilicate structure. Steaming temperatures are usually in excess of 600° F., preferably about 800 to about 1650° F. The zeolite is subjected to these temperatures for a period sufficient to convert it to the stabilized hydrogen form. The duration of this treatment is usually at least about 0.5 minutes, preferably about 30 minutes to about 4 hours at temperature. Zeolites thus treated are herein referred to as the stabilized hydrogen form of the zeolite. Sometimes only a portion of the remaining exchange capacity will be occupied by stabilized hydrogen ions. In those instances the remainder of the ion exchange capacity may be occupied by ions of another nature.

If desired, the resultant zeolite can be subjected to further ion exchange and steaming to increase the hydrogen ion content and correspondingly reduce the alkali metal content. However, I have found that the necessary degree of exchange can be efficiently accomplished by one exchange-steaming cycle.

The resultant steamed zeolite is then reexchanged with a hydrogen ion precursor under conditions sufficient to reduce the alkali metal content to less than 2 percent, usually less than one percent and preferably less than 0.6 weight-percent determined as the corresponding alkali metal oxide. These conditions are usually sufficient to produce a zeolite containing an amount of hydrogen precursor ion corresponding to at least about 5 relative percent of the original ion exchange capacity of the aluminosilicate.

Although this treatment can be applied to a variety of aluminosilicates, it is presently preferred to employ as starting materials a composition that contains at least a substantial proportion of a faujasite type of zeolite similar to the Y-zeolite described in U.S. 3,130,007. In the sodium form these zeolites usually contain pores in the range of about 5 to about 16 angstroms diameter and have relatively uniform pore size distributions. However, I have found that by subjecting those zeolites to the above-described preactivation that several beneficial changes in chemical and physical characteristics take place. Of these probably the most significant are increased activity, selectivity to products boiling within a predetermined range, thermal, hydrothermal, acid and reammoniation stability and increased pore size. With regard to this latter consideration I have discovered that this procedure accounts for a broadening of the pore size distribution with the result that, in the case of Y-zeolite type starting materials, at least about 20 percent of the pore volume of the zeolite is contained in pores having diameters in excess of about 20 angstroms. Although it has not been established with certainty, it is believed that this increase in pore size may account for some of the observed improvements in selectivity of the final catalyst compositions. Accordingly, it is presently preferred that the zeolites have nonuniform pore size distributions. In particular, it is believed that at least about 40% of the zeolite pore volume should be accounted for by pores having diameters of less than about 20 angstroms and that at least about 20 percent should be accounted for by pores having diameters in excess of about 20 angstroms.

Other zeolites preferred for use in these midbarrel hydrocracking processes are the so-called ultrastable and layered zeolites referred to above.

The refractory oxide must be precalcined at a temperature of at least about 600° F., preferably about 800° to about 1400° F., prior to combination with the zeolite and hydrogenation components. Calcination generally requires at least about 20 minutes, preferably about 30 minutes to about 6 hours.

A number of refractory oxides can be employed in these compositions. These oxides should have relatively high surface areas, e.g., above about 50 square meters per gram, should be compatible with the zeolite and hydrogenation components and should combine with the zeolite to form structurally stable aggregates. These oxides include alumina, titania, zirconia and silica-magnesia, either alone or in combination with each other and/or other oxides, e.g., silica-alumina-magnesia, silica-titania, and the like. Alumina is presently preferred, particularly when high selectivity to a certain product fraction is desired. Although it can be used in combination with other oxides such as those mentioned, the alumina should account for at least 20, usually at least 50, and preferably at least 70 percent of the refractory oxide. Minor amounts of silica can be added to these preferred catalysts although it is preferably present in amounts less than about 20 weight percent. Silica-magnesia is also useful in preparing these highly selective compositions. The combination usually contains about 5 to about 40 percent magnesia based on the combined weight of silica and magnesia.

In addition, the refractory oxide, preferably alumina, silica-alumina, silica-magnesia, or combinations thereof should not be peptized by acid treatment to any substantial extent or otherwise hydrolyzed before admixture with said zeolite and said hydrogenation component. It is sometimes desirable to peptize a minor portion of the alumina in such compositions to improve aggregate strength. However, the extent of such treatment should be kept to a minimum so that less than 50 percent of the oxide is rehydrolyzed after the thermal pretreatment.

Alumina sources includes a variety of dried or hydrous gels, sols, spray-dried aluminas and the like. However, the boehmite and gamma forms are presently preferred.

I have discovered that the described treatments result in the production of compositions in which at least about 70 percent of the alumina pore volume is in pores having diameters above about 50 angstroms. Conversely about 50 percent of the pore volume is accounted for by pores having diameters less than about 200 angstroms. It has not been established that these pore volume distributions account for any part of the noted improvements in activity and selectivity. However, it is presently believed that they account, at least in part, for one or more of the noted improvements in catalyst performance.

The third essential component of these compositions, the hydrogenation component, usually comprises one of the metals, oxides or sulfides of Groups VI and VIII. The presently preferred compositions include at least one of cobalt and nickel oxides or sulfides and at least one of molybdenum and tungsten oxides and sulfides. The advantages of these methods are particularly apparent with compositions containing nickel and/or cobalt sulfide and molybdenum sulfide. Moreover, the greatest relative advantage is obtained when one or more of the hydrogenation components, particularly tungsten and molybdenum, and especially molybdenum, are combined with the alumina and/or zeolite prior to any high temperature thermal treatment. Accordingly, the hydrogenation component or precursor is usually combined with the refractory oxide and zeolite by intimate admixture of the three components in the presence of sufficient water to produce a formable plastic mixture. This approach is preferred due to the desirability of forming the resulting combination into particulate aggregates such as extrudates, tablets, spheres or the like. About 30 to about 60 weight percent water is usually sufficient for this purpose.

The Group VIII components, notably nickel and cobalt, can be added as water-soluble compounds such as the carbonates, sulfates, nitrates or halides. In the alternative, they can be present in the form of complex molybdenum salts, such as the complex cobalt or nickel molybdophosphates, molybdosilicates and the like. Similarly, the Group VI components, particularly tungsten and/or molybdenum, can be added as either soluble or insoluble compounds including the oxides, e.g., tungstic oxide, molybdic oxide, molybdenum blue, or salts such as ammonium phosphomolybdate, ammonium molybdate, ammonium dimolybdate and the complex metal salts mentioned above.

A particularly preferred method of combining these several components involves comulling the refractory oxide and zeolite with at least one nickel or cobalt compound and at least one molybdenum or tungsten compound in the presence of water. The aqueous medium can also contain a constituent capable of solubilizing the Group VI and/or Group VIII components or complexing the Group VI and Group VIII components with each other. Exemplary materials are orthophosphoric acid, ammonium hydroxide, and hydrogen peroxide, orthophosphoric acid being presently preferred. Thus, the aqueous phase can contain sufficient orthophosphoric acid to reduce the pH to a level below about 5, preferably below about 4, and introduce at least about 0.5 and preferably about 1 to about 7 weight percent phosphorus as $P_2O_5$. The catalyst usually contains at least about 0.5 and preferably about 2 to about 10 weight percent of the Group VIII component and at least about 1, preferably about 2 to about 40 weight percent of the Group VI component determined as the respective oxides.

The refractory oxide and zeolite should be admixed in finely divided particulate form such that an intimate dispersion of each component with the other can be easily achieved. Accordingly, it is preferred that the predominance of both the oxide and zeolite be in the form of particles, powders, flakes or the like having average diameters of less than about 2 microns.

The amount of zeolite thus added should correspond to at least about 1, and preferably about 2 to about 80 weight percent based on the total dry weight of the zeolite and oxide. However, the compositions presently most preferred for denitrogenation and/or selective hydrocracking usually contain about 2 to about 30 weight percent zeolite.

The intimate dispersion of refractory oxide, zeolite and hydrogeneration components is then formed into the desired particle aggregate by any one of the several known procedures including extrusion, pelleting and the like. The pellets are then calcined directly with or without initial drying. Calcination temperatures are usually in excess of about 600° F., preferably at about 800° to about 1500° F. The calcined composition is then preferably sulfided by contacting with a sulfur donor for a period sufficient to convert the hydrogenation metals or metal oxides to the corresponding sulfides. Conventional sulfur donors include hydrogen sulfide, carbon bisulfide, elemental sulfur, hydrocarbon thiols and thioethers having up to 10 carbon atoms per molecule, and the like. In the alternative, the catalyst can be sulfided in situ in a hydrocarbon conversion zone by exposure to a hydrocarbon feed containing organosulfur compounds under conditions sufficient to convert the metals or metal oxides to the corresponding sulfides.

In general these processes involve the reaction of hydrocarbons with elemental hydrogen under hydroconversion conditions of temperature, pressure and contact times sufficient to react at least about 50 standard cubic feet of hydrogen with each barrel of hydrocarbon feed. However, these compositions exhibit the greatest advantage in processes of more limited scope. These include the hydrogenative conversion of hydrocarbons to lower molecular weight products boiling within predetermined boiling ranges and hydrofining systems, particularly those involving hydrogenative denitrogenation.

In most hydrocracking processes a principle portion of the feed boils in excess of about 300° F., usually in excess of about 500° F. However, in accordance with a preferred embodiment midbarrel fuels boiling primarily between about 350° and about 700° F. are selectively produced from feeds boiling primarily above about 700 F., usually about 700 to about 1300° F. Usually at least about 70 percent of the feed in the preferred midbarrel systems will boil above 700° F. Exemplary refinery feedstocks are straight run gas oils, vacuum gas oils, deasphalted vacuum and atmospheric residua, coker distillates, catcracker distillates, cycle stocks and the like.

Hydrocracking systems are distinguished from other hydrogenative reactions such as aromatics and olefin hydrogenation, denitrogenation and desulfurization, by the substantial reduction in initial boiling point of the hydrocarbon feed. For the purposes of this invention, hydrocracking involves the conversion of at least 20 volume-percent of the feed to materials boiling below its initial boiling point. In most commercial applications it is generally preferred to convert at least 40 volume-percent of the feed per pass.

At times, however, hydrocracking cannot be characterized in this manner due to the inclusion of minor amounts of relatively low boiling materials in the feedstock. Nevertheless it may be distinguished from less severe hydrogenative processes by comparing the number of moles of product produced to the amount of feedstock reacted. On this basis hydrocracking usually involves the production of at least 110 moles of product for each 100 moles of feed. However, higher conversions involving the production of at least 120 moles of product for each 100 moles of feed are generally preferred. These reactions can be even further characterized by relatively higher net hydrogen consumption which usually exceeds about 250 standards cubic feet net hydrogen consumed per barrel of feed.

As illustrated by the examples hereinafter detailed, the compositions and methods of this invention are particularly attractive for the conversion of higher boiling hydrocarbons to either midbarrel or gasoline range products. The selectivity of these systems for the desired product of predetermined boiling range, i.e., midbarrel or gasoline products, is vastly superior to alternative systems.

Considerable overlap can and does exist between the definitions of midbarrel and gasoline range hydrocarbons. At least part of this overlap depends on the selection of product cut points for convenience of identification. A much more significant variable however is the difference in product properties required to meet specific end uses, and/or the tailoring of hydrocrackate required to obtain the optimum performance of post treatment systems such as reforming and isomerization. However, as a general rule midbarrel products, a category which includes diesel fuels, turbine fuels and furnace oils, are usually characterized by a boiling point range of about 300° to about 700° F. Diesel fuels boil primarily below about 570° F. while turbine and furnace fractions boil predominantly below 675° F. and 700° F., respectively. The $C_5$ to about 500° F. fraction is generally classified as gasoline.

Regardless of the exact definition given to the product fraction, any attempt to produce any of these products involves conversion of a substantial proportion of the feed to hydrocarbons boiling below the desired product range. If the amount of such conversion can be reduced while maintaining the same rate of conversion to the desired product boiling range, the economics of the system are obviously improved. It is this balance of overall conversion and conversion to the desired product, that is referred to as selectivity. It is therefore significant that these methods exhibit a greater degree of selectivity to a specified product boiling range than do analogous processes. In other words, a greater proportion of the product boils within the desired predetermined range. Conversion to products boiling outside this range, particularly to lower boiling materials, is correspondingly reduced.

An additional advantage of these methods is that their activity and selectivity is affected to a much lesser extent by catalyst inhibitors such as organonitrogen compounds. Accordingly, the hydrocarbons employed in these systems often contain in excess of about 5, and can contain as much as 50 or 900 p.p.m. or more of nitrogen as organonitrogen compounds without losing too much efficiency.

Conversion is usually carried out at temperatures of at least 400° F. preferably in excess of 600° F., and generally in the range of about 600 to about 900° F. Reaction pressures are generally over 500 p.s.i.g. in hydrocracking systems although lower pressures can be employed for denitrogenation. However, most commercial hydrocracking operations involve pressures in excess of about 1000 p.s.i.g., usually about 1500 to about 3000 p.s.i.g.

The degree of contacting of the hydrocarbon feed at these conditions will of course depend upon the extent of conversion desired and the severity of reaction conditions required to obtain that conversion. In essentially every case, including both hydrocracking and denitrogenation, contact times will exceed one minute. Corresponding liquid hourly space velocities are usually less than about 10 and are preferably within the range of about 0.3 to about 5. Hydrogen addition rates correspond to about 500, and, usually about 4000 to about 20,000 s.c.f. of hydrogen per barrel of hydrocarbon.

As a general rule when hydrocracking to midbarrel fuels is a primary objective, reaction conditions within the ranges discussed will usually be selected so as to effect at least about 40 percent conversion per pass to products boiling below the initial feed boiling point, e.g., less than about 700° F. Conversion efficiency is usually indicated by a selectivity of at least about 50 percent.

A somewhat wider range of reaction conditions and feedstock characteristics can be employed in denitrogenation processes. For example, there are essentially no limitations on the organo-nitrogen content of the feed. Nitrogen levels can range from 5 p.p.m. up and are usually about 50 p.p.m. to about 1.5 percent. The feedstock boiling range or initial boiling point is also much more variable than in the case of gasoline or midbarrel hydrocracking. For example, these materials can boil as low as 100° F. but generally boil above about 400° F. The ranges of reaction temperatures, pressures and space velocities are quite similar to those discussed with regard to hydrocracking. However, lower pressures and higher space velocities are generally sufficient to accomplish the desired degree of denitrogenation without substantial hydrocracking.

The characteristics of these compositions and methods are demonstrated by the following examples. These examples are intended only for the purpose of illustration, however, and should not be construed as limiting the scope of these concepts.

Examples 1 through 4

A stable zeolite of the Y-zeolite type having an enlarged pore size distribution and being stable to thermal, hydrothermal and ammonia environments containing 0.2 weight percent $Na_2O$ and having 30 volume percent of its pore volume in pores having diameters greater than 20 angstroms was prepared from a sodium Y-zeolite containing about 13 weight percent sodium as $Na_2O$.

The alumina starting material was commercially available Kaiser spray-dried gamma-alumina.

Amounts of the zeolite and alumina corresponding to 20 weight percent zeolite and 80 weight percent alumina on a dry weight basis were mulled together to form an intimate dispersion of the two components. This mixture was then contacted with an aqueous solution containing nickel and molybdenum salts and phosphoric acid. This solution was prepared by admixing sufficient nickel nitrate hexahydrate, ammonium heptamolybdate and orthophosphoric acid to produce a solution containing about 6 weight percent nickel as NiO, 18 weight percent $MoO_3$ and 3 weight percent phosphorus. The solution pH prior to contacting with the alumina-zeolite combination was 1.1. Then 385 milliliters of this solution were added to the muller containing 400 grams of the zeolite-alumina combination. This mixture was mulled with 100 milliliters additional water for about 30 to 45 minutes to form an extrudable paste which was then formed into $\frac{1}{16}$-inch extrudates. The extrudates were then calcined in a muffle furnace at 900° F. in flowing dry air for two hours. The composition of the final catalyst after calcination corresponded to 7.3 weight percent NiO, 20.8 percent $MoO_3$, and 6.3 percent $P_2O_5$. This material had a surface area of 255 square meters per gram. Of the pore volume 46 percent was accounted for by pores having diameters of less than 50 angstroms, and 8.2 percent was accounted for by pores having diameters greater than 200 angstroms. Pore distributions were measured by nitrogen desorption using an Aminco "Adsorptomat". The data was reduced by means of the supplied computer program based on the Barrett, Joyner and Halenda treatment, J. American Chemical Society, 73, 373 (1951).

Three more compositions were prepared by this procedure. However, in each case the gamma alumina starting material was precalcined in the presence of less than one p.s.i. water vapor pressure. The compositions of Examples 2 through 4 were prepared from aluminas calcined at 900° F., 1200° F. and 1400° F., respectively. The composition, surface areas and pore characteristics of the resulting combinations are summarized in the following table.

TABLE 1

| Example number | 1 | 2 | 3 | 4 |
|---|---|---|---|---|
| Calcination temp.,° F | Dried | 900 | 1,200 | 1,400 |
| Composition, wt. percent: | | | | |
| NiO | 7.3 | 7.5 | 7.6 | 7.6 |
| $MoO_3$ | 20.8 | 20.3 | 21.3 | 20.1 |
| $P_2O_5$ | 6.3 | 6.7 | 6.5 | 6.8 |
| Surface area, m.²/g | 255 | 199 | 180 | 152 |
| Pore volume, percent: | | | | |
| 200 to 600 A., $\phi$ | 8.2 | 15.4 | 17.4 | 24.2 |
| Less than 50 A., $\phi$ | 46 | 20.2 | 17.4 | 10.5 |

Examples 5 through 8

The compositions of Examples 1 through 4 were presulfided by contacting with a 10 percent mixture of hydrogen sulfide in hydrogen at a temperature of 700° F. for 2 hours. Each of the resulting materials was then employed to hydrocrack a Kuwait gas oil feed boiling between 550 and 980° F. containing 2190 p.p.m. nitrogen and 2.9 wt. percent sulfur as organosulfur compound. The reaction was conducted in a downflow fixed bed reactor operated at 1800 p.s.i.g., a liquid hourly space velocity of 1.5 and a hydrogen addition rate of 10,000 standard cubic feed per barrel of feed. The reaction temperature required to obtain 50 percent conversion per pass to products boiling below 570° F. was determined in each instance. Selectivity of conversion in each case to turbine fuel products boiling between 300° and 570° F. was also evaluated. These results are reported in Table 2.

TABLE 2

| Example | 5 | 6 | 7 | 8 |
|---|---|---|---|---|
| Catalyst of Example | 1 | 2 | 3 | 4 |
| Reaction temperature,° F | 734 | 732 | 736 | 738 |
| Conversion, percent ff | 50 | 50 | 50 | 50 |
| Selectivity [1] | 61 | 67.3 | 65.6 | 68.5 |

[1] Selectivity to turbine fuel boiling between 300 and 570° F.

Examples 9 through 12

In each of these examples the denitrogenation activity of the compositions described in Examples 1 through 4 was determined by analyzing the nitrogen content of the residual materials boiling above the product cut-point, i.e., that fraction containing hydrocarbons boiling above 570° F. In Examples 9 and 10 the nitrogen content of the total range product including both the 570° minus product and the higher boiling fractions was also evaluated. These results are reported in the following table.

TABLE 3

| Example number | 9 | 10 | 11 | 1 |
|---|---|---|---|---|
| Catalyst of Example | | | | |
| Residual nitrogen, p.p.m.:[1] | 1 | 2 | 3 | |
| Recycle fraction | 24 | 3.6 | 5.5 | 2.3 |
| Full range product | 11.0 | 1.4 | ([2]) | ([2]) |

[1] As organonitrogen compound.
[2] Not determined.

Example 13

A composition containing silica-magnesia, zeolite Y, alumina and a hydrogenation component was prepared from 144.5 grams of nickel nitrate hexahydrate, 173 grams of ammonium metatungstate, 15.8 grams (12.5 grams dry weight) of the Y zeolite treated as described in Example 1, 502.8 grams (437.5 grams dry weight) of uncalcined silica-magnesia (70 percent silica, 30 percent magnesia), 178.6 grams of peptized gamma alumina (50 grams dry weight basis) and 165 mililiters of water. These constituents were mulled for 45 minutes to form an extrudable paste. The resulting mixture was then extruded through a 1/16-inch die after which the extrudates were dried and calcined at 900° F. for 2 hours. The resultant composition contained 5.24 percent NiO, 21.29 percent $WO_3$ and had a surface of 343 square meters per gram and a pore volume of 0.32 cc./g.

Example 14

A comparison composition containing silica-magnesia prepared in accordance with this invention was produced in the manner described in Example 13 with the exception that the silica-magnesia was preactivated by thermal treatment at 1200° F., for 2 hours prior to combination with the zeolite, alumina and hydrogenation components. The final composition contained 5.33 percent NiO, 22.13 percent $WO_3$ and had a surface area of 294 square meters per gram and a pore volume of 0.36 cc./g.

Example 15

A tungsten containing alumina-zeolite Y composition was prepared in accordance with this invention from 72.25 grams of nickel nitrate hexahydrate, 86.5 grams of ammonium tungstate, 63.2 grams (50 grams dry weight) of the stabilized Y zeolite (as described in Example 1), 204 grams of precalcined alumina and 230 mililiters of water. These materials were comulled for 45 minutes as described in Example 13. The alumina starting material was Kaiser spray dried alumina and was thermally pretreated at 1200° F. for 2 hours prior to combination with both the zeolite and hydrogenation component. This mixture was then extruded, dried and calcined as described in Example 13. The final product contained 5.51 weight percent NiO, 22.66 percent $WO_3$ and exhibited a surface area of 239 square meters per gram and a pore volume of 0.64 cc./g.

The foregoing comparative examples demonstrate that these methods employing the compositions described in Examples 2 through 4 exhibit markedly higher selectivity to midbarrel products at otherwise identical conditions even though they possessed only 80 percent or less of the surface area of the comparison material described in Example 1. In addition, Examples 9 through 12 demonstrated that these processes exhibit dramtically superior denitrogenation characteristics corresponding to a severalfold increase in denitrogenation rate. They further demonstrate that the inventive systems exhibit markedly superior selectivity to products boiling within a predetermined range when operating on feeds containing substantial amounts of organonitrogen compounds.

I claim:

1. A process for hydrogenatively converting organonitrogen compounds and/or hydrocarbons in a mineral oil feedstock, which comprises contacting said feedstock plus added hydrogen under hydrogenative conversion conditions with a catalyst comprising (a) at least about one weight-percent of a crystalline zeolitic aluminosilicate containing zeolitic hydrogen ions, (b) at least about 10 weight-percent of an amorphous refractory oxide selected from the class consisting of alumina, titania, zirconia and silica-magnesia, and (c) a catalytic amount of a hydrogenation component comprising at least one of the Group VIB and/or Group VIII metals, oxides, and sulfides; said catalyst having been prepared by the steps of (1) thermally activating said refractory oxide at a temperature of at least 600° F. prior to admixture with said aluminosilicate and said hydrogenation component, (2) intimately admixing the resulting activated refractory oxide with said aluminosilicate in finely divided form, (3) forming particulate aggregates of the resulting admixture having said hydrogenation component intimately distributed therein, and (4) thermally activating said aggregates.

2. A process as defined in claim 1 wherein said feedstock boils primarily above about 400° F., and is contacted with said catalyst under conditions adjusted to effect a substantial hydrocracking of hydrocarbons.

3. A process as defined in claim 1 wherein said feedstock contains a substantial proportion or organonitrogen compounds, and said contacting is carried out under conditions adjusted to effect substantial denitrogenation.

4. A process as defined in claim 1 wherein said aluminosilicate is a Y zeolite containing less than 2 weight-percent of alkali metal, and in which at least about 20 volume-percent of the crystal pores thereof have diameters in excess of 20 A., and said refractory oxide is primarily alumina, at least about 70 percent of the pore volume of said alumina being in pores having diameters in excess of 50 A.

5. A process as defined in claim 4 wherein said feedstock boils primarily above about 700° F., and is contacted with said catalyst under hydrocracking conditions adjusted to convert a substantial proportion of said feedstock to midbarrel products boiling primarily between about 300° F. and 700° F.

6. A process as defined in claim 4 wherein said feedstock contains a substantial proportion of organonitrogen compounds, and said contacting is carried out under conditions adjusted to effect substantial denitrogenation.

7. A process as defined in claim 1 wherein said refractory oxide is essentially alumina, and said aluminosilicate is a Y zeolite which, prior to admixture with said alumina, has been stabilized by (a) partially exchanging the zeolitic alkali metal ions of said zeolite with ammonium ions, (b) calcining the partially exchanged zeolite in the presence of at least about 2 p.s.i. of water vapor pressure at a temperature sufficient to effect conversion of said ammonium ions to hydrogen ions, and (c) reexchanging the resultant calcined zeolite with ammonium ions to reduce the zeolitic alkali metal content to below about 2 weight-percent.

8. A process as defined in claim 7 wherein said hydrogenation component comprises (1) cobalt and/or nickel, or the oxides or sulfides thereof, plus (2) molybdenum and/or tungsten, or the oxides or sulfides thereof.

9. A process as defined in claim 8 wherein said feedstock boils primarily above about 700° F., and is contacted with said catalyst under hydrocracking conditions adjusted to convert a substantial proportion of said feedstock to midbarrel products boiling primarily between about 300° F. and 700° F.

10. A process as defined in claim 8 wherein said feedstock contains a substantial proportion of organonitrogen compounds, and said contacting is effected under conditions adjusted to effect substantial denitrogenation

References Cited

UNITED STATES PATENTS

| | | | |
|---|---|---|---|
| 3,269,934 | 8/1966 | Hansford | 208—111 |
| 3,554,899 | 1/1971 | Hansford | 208—111 |
| 3,607,727 | 9/1971 | Hayes | 208—111 |
| 3,617,485 | 11/1971 | Kittrell | 208—59 |
| 3,617,507 | 11/1971 | Oettinger et al. | 208—111 |
| 3,617,527 | 11/1971 | Hilfman | 208—216 |
| 3,652,449 | 3/1972 | Young et al. | 208—111 |
| 3,706,693 | 12/1972 | Mickelson et al. | 252—435 |
| 3,725,243 | 4/1973 | Hass et al. | 280—59 |
| 3,726,790 | 4/1973 | Gallagher et al. | 208—111 |

DELBERT E. GANTZ, Primary Examiner

G. E. SCHMITKONS, Assistant Examiner

U.S. Cl. X.R.

208—216, 254 H; 252—439, 455 Z